United States Patent [19]

Mino et al.

[11] Patent Number: 4,715,609
[45] Date of Patent: Dec. 29, 1987

[54] SEAL ELEMENT FOR SEALING DUCTS OF AN AIR CONDITIONER SYSTEM

[75] Inventors: Kaoru Mino; Koji Fukushima; Takashi Kasai, all of Konan, Japan

[73] Assignee: Diesel Kiki Co., Ltd., Tokyo, Japan

[21] Appl. No.: 804,256

[22] Filed: Dec. 3, 1985

[30] Foreign Application Priority Data

Dec. 7, 1984 [JP] Japan ............................ 59-185758[U]
Dec. 10, 1984 [JP] Japan ................................ 59-259267

[51] Int. Cl.$^4$ ................................................ F16J 15/10
[52] U.S. Cl. .................................. 277/207 R; 277/228; 277/229
[58] Field of Search ............. 277/165, 207 R, 227–231

[56] References Cited

U.S. PATENT DOCUMENTS

| 2,744,847 | 5/1956 | Orr | 277/207 X |
| 2,893,795 | 7/1959 | Dooling | 277/207 X |
| 2,910,209 | 10/1959 | Nelson | 277/207 X |
| 3,750,411 | 8/1973 | Shimizu | 277/229 X |

FOREIGN PATENT DOCUMENTS

| 1109468 | 6/1961 | Fed. Rep. of Germany | 277/207 |
| 3002612 | 7/1981 | Fed. Rep. of Germany | 277/229 |
| 1064972 | 12/1953 | France | 277/228 |
| 48-94337 | 11/1973 | Japan . | |
| 56-135564 | 10/1981 | Japan . | |

Primary Examiner—Robert S. Ward
Attorney, Agent, or Firm—Wenderoth, Lind & Ponack

[57] ABSTRACT

A seal element includes an elastic body of substantially D-shaped cross section and a sealing fin projecting integrally from an arcuate surface of the D-shaped body. The fin is compact and has an elasticity less than the elasticity of the body. The seal element thus constructed is elastically deformable on installation to such an extent that the arcuate surface is urged by the fin to flex inwardly toward an opposite flat surface of the D-shaped body and is held into sealing engagement with the surface of mating joint surfaces along its two longitudinal portions disposed an opposite sides of the fin.

3 Claims, 12 Drawing Figures

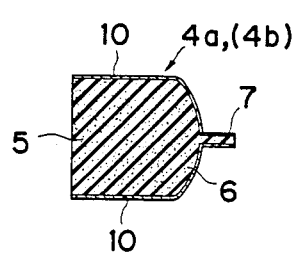
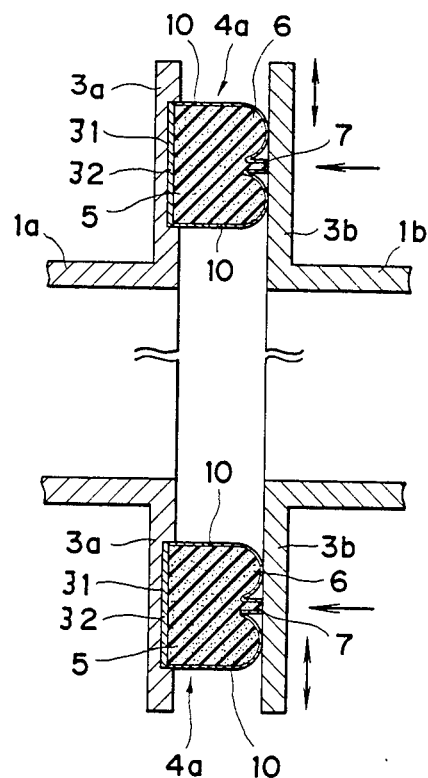
FIG. 1(a)
FIG. 1(b)

FIG. 4(a)
(FIG. 4(b))
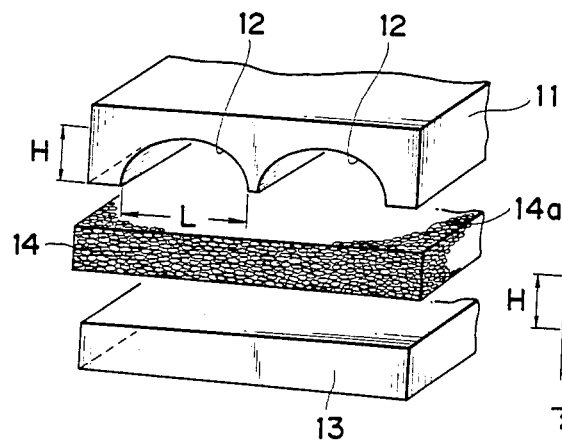
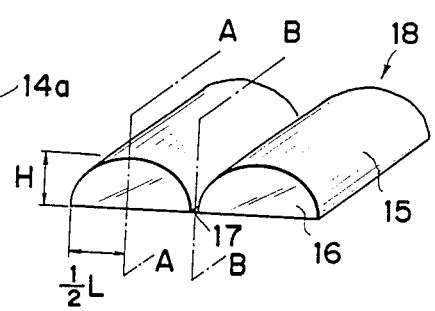
FIG. 5
FIG. 7
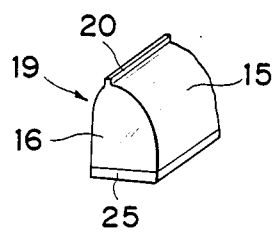
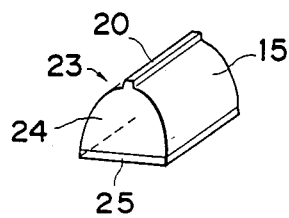

SEAL ELEMENT FOR SEALING DUCTS OF AN AIR CONDITIONER SYSTEM

BACKGROUND OF THE INVENTION

1. Field of the Invention

The present invention relates to a seal element suitable for use in an air conditioner system to provide a seal between opposed ducts of the air conditioner system. There is also a method for making such seal element.

2. Prior Art

A number of elastic seal elements made in various shapes are known and used for providing a seal by being squeezed between opposed surfaces of two adjacent ducts of an air conditioner system installed in an automobile, for example.

Once such known seal element is disclosed in Japanese Utility Model Laid-open Publication No. 56-135564. The disclosed seal element has a square cross-sectional shape, and because of this cross-sectional-sectional shape, it performs satisfactorily only when installed correctly. More specifically, the square seal element fits flatwise against opposed surfaces of two adjacent ducts when diametrically squeezed on installation, however, it is likely to tilt when subjected to forces applied in a direction parallel to a seal plane during installation.

When installed in such tilted condition, the square seal element is intensely squeezed at its diagonal corner edges whereas opposite surfaces of the same element come out of contact with the opposed ducts surfaces. As a result, only a small sealing area is provided between the tilted seal element and each duct surface, which would cause leakage of condensed moisture under osmotic pressure.

Another seal element shown in the above-mentioned Japanese document has outwardly swelled sealing surface engageable with opposed surfaces of two adjacent ducts. This seal element is elastically deformable to engage with the duct surfaces substantially over the entire regions of the respective sealing surfaces even when subjected to forces applied parallel to a seal plane during installation. Contrary to the largeness of the sealing area, the sealing element has a small amount of compression which gives a small sealing pressure to the duct surfaces. With this arrangement, moisture leak would take place at the joint.

Japanese Utility Model Laid-open Publication No. 48-94337 discloses a seal element formed from a foamed material, such as foamed rubber or foamed plastics, into a semi-circular or substantially D-shaped cross section. The disclosed seal element also has the same drawback as the foregoing element.

In summary, the prior seal elements are disadvantageous in that a fluid-tight seal is difficult to achieve due to imbalance between the sealing area and the sealing pressure depending on the compressibility of the individual sealing elements.

It is customary practice to make a seal element of a foamed material either by (a) vulcanizing unvulcanized rubber foam in a heated mold, (b) extruding a foamed material form a shaping die, (c) molding a molten compound such as polyurethane form, or (d) compressing a foam sheet between a pair of molds jointly defining grooves of an accurate cross section. Neither of the foregoing methods has been found satisfactory.

Vulcanizing requires a relatively long processing time and is likely to produce seal elements whose properties vary with the degree of vulcanization particularly when a high extent of forming is intended. Extrusion is disadvantageous in that foamed seal elements of uniform quality are difficult to obtain particularly when extruding an open-cell foamed material at a high rate of extrusion. Compound molding requires a number of molds for moss-production and hence is expensive, is incapable of continuous operation and less efficient. Another drawback associated with compound molding is in that the molten material, as it is cured in the mold, is likely to create pinholes or to cause local pealing-off of a skin due to charge in the mold temperature.

Compression forming is achieved in the manners shown in FIGS. 8(a) and 8(b) of the accompanying drawings. As shown in FIG. 8(a), a foam sheet 80 is placed between an upper shaping die 81 and a lower planar die 82, the shaping die 81 and a lower planar die 82, the shaping die 81 including a plurality of downwardly open, parallel spaced grooves 83 of a U-shaped cross-section. Then, the upper shaping die 81 and the lower die 82 are moved toward each other to compress the foam sheet 80 therebetween, thereby producing a blank seal element 84 comprising a plurality of substantially semicylindrical bodies 85 joined together by narrow webs 86. Finally, the blank seal element 84 is cut along the webs 86 into the individual semicylindrical bodies 85 each of which constitutes a foamed seal element. The seal element 85 includes an upper accurate surface 87 engageable with are duct, and flat lower surface 88 engageable with the other duct, the seal element 85 having a thickness h. The upper accurate surface 87 is stretched greater than the lower flat surface 88 so that the surface 87 has a larger extent than the surface 88. The seal element 85 thus obtained has a limited thickness even when formed with upper shaping die having grooves of a larger depth H. The highly stretched and compressed upper region is dense and hence has a low elasticity, so it is difficult to use such seal element 85 at a corner joint. Furthermore, the seal element 85 is relatively thin and hence is not suitable for use in an automobile air conditioner system wherein a space between opposed surfaces of two adjacent ducts is relatively large due to accumulated tolerances caused form working and assembling of components of the air conditioner system.

SUMMARY OF THE INVENTION

An object of the present invention is to provide an elastic seal element having structural features capable of providing a fluid-tight seal between opposed surfaces of two adjacent joint members even when subjected to forces applied parallel to a seal plane during installation.

Another object of the present invention is to provide an elastic seal element having a relatively large thickness.

A method of making the foregoing seal element is provided.

A further method of making a seal element at increased rate of production is provided.

According to a first aspect to the present invention, there is provided a seal element for providing a seal by being squeezed between opposed surfaces of a pair of joint members, said seal element comprising an elongate body of an elastic material and having a pair of side surfaces sealing engageable respectively with the surfaces of the joint members, one of said side surfaces having an outwardly swelled configuration, said elastic body having along its entire length an elongated fin projecting integrally from said swelled one side surface, when said seal element is squeezed between the opposed surfaces of the joint members, said elastic body being elastically deformable in such a manner that said one side surface is urged by said fin to flex inwardly toward the other side surface and has two longitudinal portions disposed one on each side of said fin and held in sealing engagement with the surface of one joint member.

There is provided a method of making a foamed seal element, comprising the step of: compressing a foam sheet between a pair of mating shaping dies defining jointly therebetween at least two parallel grooves of an arcuate cross section, thereby producing a blank seal element composed of two elongated bodies of an arcuate cross section, and a thin connecting portion interconnecting said elongated bodies; and cutting said blank seal element along said connecting portion and centrally along each said elongated body.

Many other advantages, features and additional objects of the present invention will become manifest to those verse in that art upon making reference to the detailed description and the accompanying drawings in which preferred embodiments incorporating the principles of the invention are shown by way of illustrative example.

BRIEF DESCRIPTION OF THE DRAWINGS

FIG. 1(a) is cross-sectional view of a seal element according to the present invention;

FIG. 1(b) is a fragmentary cross-sectional view of a joint structure in which the seal element of FIG. 1(a) is employed;

FIG. 4(a) is a fragmentary perspective view illustrating a manner in which a foam sheet is compressed according to the present invention;

FIG. 4(b) is a perspective view of blank seal element formed from the foam sheet shown in FIG. 4(a);

FIG. 5 is a fragmentary perspective view of a seal element produced from the blank seal element shown in FIG. 4(b);

FIG. 7 is a fragmentary perspective view of a seal element produced from the blank seal element shown in FIG. 6(b);

DETAILED DESCRIPTION

Figure 2:
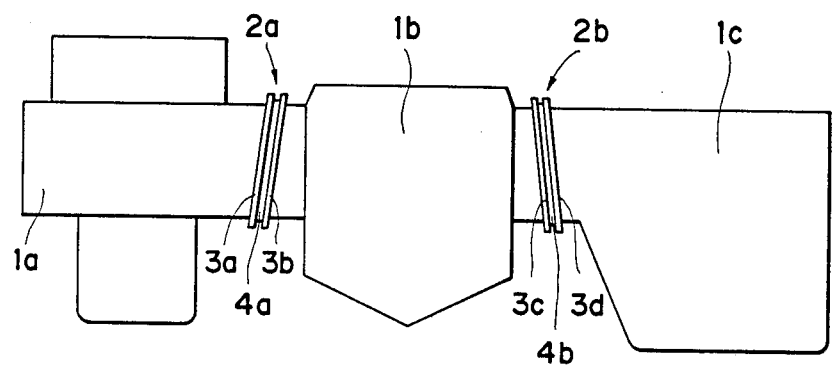
FIG. 2 is schematic front elevational view, on reduced scale, of a duct assembly including two such joint structures shown in FIG. 1(b)

Like or corresponding parts are denoted by like or corresponding reference characters throughout several views.

FIG. 2 shows a duct assembly of an automobile air conditioner system which includes three ducts 1a-1c interconnected tougher via two joint structure 2a,2b. The first duct 1a includes a blower (not shown) disposed therein. The second duct 1b shows an evaporator on the like heat exchanger element for cooling air passing therethrough. And the third duct 1c includes a heater core or the like heat exchanger element for heating. Each of the joint structures 2a,2b includes a seal element 4a,4b interposed between a pair of opposed flanges 3a,3b; 3c,3d formed on adjacent ends of the ducts 1a,1b;1b,1c.

In installation, the first and third ducts 1a,1c are connected respectively to predetermined portions of a vehicle body (not shown). Then the intermediate or second duct 1b is inserted into a space between the ducts 1a,1c with the seal elements 4a,4b interposed between the ducts 1a-1c. During that time, each seal element 4a,4b is subjected to forces applied both parallel and perpendicular to the longitudinal axis of the duct assembly.

Figure 3:
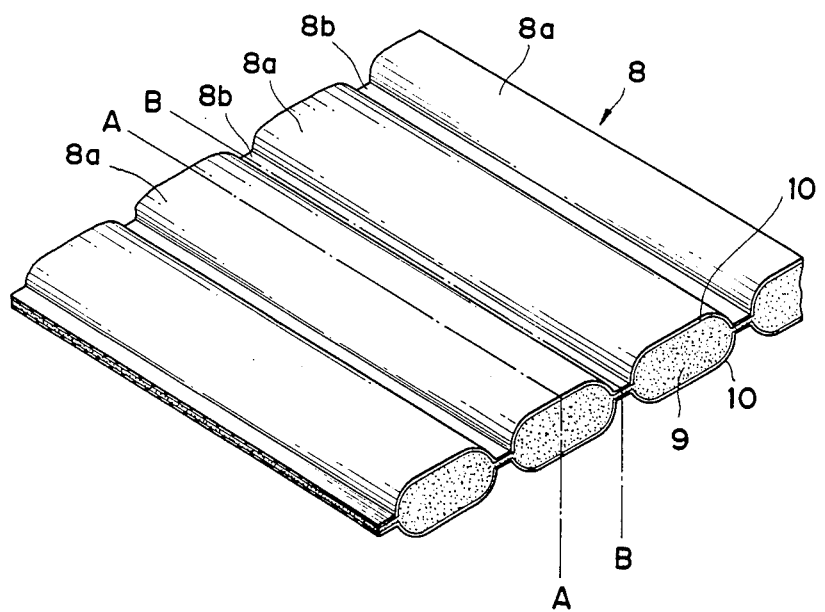
FIG. 3 is a perspective view of a blank seal element from which the seal element shown in FIG. 1(a) is produced.

The seal element 4a,4b are made of an elastic material such as urethane foam and, as shown in FIG. 1(a), it is composed of an elongate body of a substantially semi-oblong or D-shaped cross section including a flat said surface 5 and an outwardly swelled arcuate side surface 6. The body also includes along its entire length an elongated fin 7 projecting foam the central portion of the arcuate side surface 6. The flat side surface 5 of the D-shaped body extends in a plan defining the minor axis of an oblong shape defined by two such D-shapes, and the fin extends in a plane defining the major axis of the oblong shape. The seal elements 4a,4b are produced by cutting a blank seal element 8 such as shown in FIG. 3.

The blank seal element 8 includes a plurality of parallel elongated bodies 8a of an oblong cross section and thin connecting portions 8b interconnecting adjacent bodies 8a. The blank seal element 8 is cut along a pair of parallel cutting planes A,B. The plane A extends centrally along at the respective body and defines the minor axis of the oblong shape. The plane B extends along a center of each connecting portion 8b which is located remote from the cutting line A. Upon cutting, individual seal elements which are the same as the sealing element 4a,4b are produced.

To make the blank seal element 8, a foam sheet is compressed on a hot press (not shown) into the illustrated structure. The blank seal element 8 comprises a cellular core 9 and a skin 10 substantially covering the cellular core 9 by the heat of the hot pressing. After severance of the blank seal element 8, the skin still covers upper and lower sides of the seal element 4a,4b.

On installation, the flat side surface 5 of each seal element 4a,4b is received in a groove 31 provided in the flange 3a of the first duct 1a and then it is bonded to the bottom surface of the groove 31 by an adhesive such as a tape 32 with a sticky substance on opposite surfaces. The fin 7 and thence the curved side surface 6 is urged toward the flat side surface 5. More specifically, when subjected to lateral pressure, the fin 7 is urged toward the flat side surface 5, thereby causing the arcuate side surface 6 flex inwardly at the central portion thereof. Continuing compression of the seal element 4a,4b cause the centrally inwardly flexed arcuate side surface 6 to come into sealing engagement with the flange 3b of the second duct 1b along its two longitudinal portions which are disposed on opposite sides of the elongated fin 7. As described above, the seal element 4a,4b is also subjected to forces applied parallel to joint or sealing plane as the second duct 1b is displaced in the same direction with respect to the first and third ducts 1a,1c.

During that time, partly because of a high elasticity of the foamed core 9 and partly because of the compact fin 7, the fin 7 follows or accommodates the relative displacement of the ducts 1a, 1b while keeping a fluid-tight seal provided both between the fin 7 and the flange 3b of the duct 1b, and between the arcuate side surface 6 and the flange 3b. As shown in FIG. 1(b), a total of three seals are provided between the seal element 4a,4b and the flange 3b of the second duct 1b with the result that a leak-free joint structure is achieved.

In addition to a brief description given hereinbefore, a method of forming the present invention is described below in detail with reference to an embodiment shown in FIG. 4(a) through 5.

FIG. 4(a) shows a shaping die assembly composed of an upper shaping die 11 having in its bottom surface a plurality of parallel spaced elongate grooves 12 of a semi-elliptical cross section, and a lower die 13 having a flat top surface. The upper and lower dies 11,13 are reciprocally movable toward each other to compress a foam sheet 14 therebetween. During that time, the upper surface 14a of the foam sheet 14 is squeezed into the grooves 12 to thereby form arcuate portions 15 of respective thick elongated bodies 16 interconnected by thin connecting portions 17 disposed between adjacent bodies 16. The bodies 16 and the connecting portions 17 jointly constitute a blank seal element 18. In FIG. 4(a), L denotes the width of the grooves 12 and H denotes the depth of the grooves 12.

The blank seal element 18 then is cut along two parallel cutting planes A—A, B—B. The plane A—A extends perpendicular to the flat bottom surface of each elongated body 16 along the longitudinal central axis of the body 16. The plane B—B extends along a center of each connecting portion 17 which is located remote from the same body 16. As a result, a seal element 19 is produced as shown in FIG. 5. The seal element 19 has a height equal to ½ L. Accordingly, the height of the seal element 19 is variable with the width of the grooves 12.

A seal element of an increased height can easily be produced with the use of a shaping die assembly defining grooves of larger width. The connecting portion 17 constitutes a sealing fin or rip 20 projecting from an upper and of the arcuate portion 15 of the elongated body 16. As the sealing fin 20 is compressed much greater than the body 16, it has an elasticity or compressibility much smaller than the elasticity or compressibility of the body 16. On installation of the seal element 19, the sealing fin 20 is sealingly engageable with a mating surface of one joint member (neither shown).

Figure 6A:
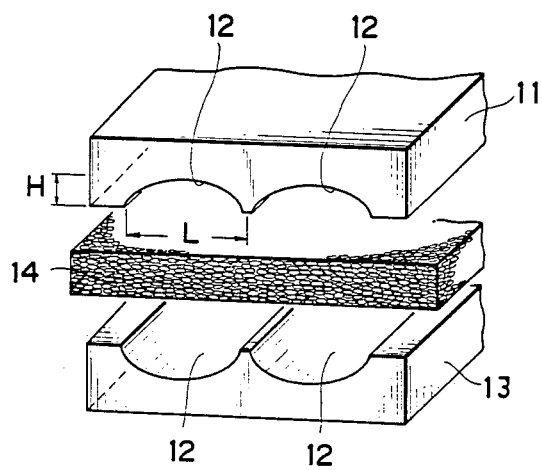
FIG. 6(a) is a view similar to FIG. 4(a) showing a modified shaping die assembly.
Figure 6B:
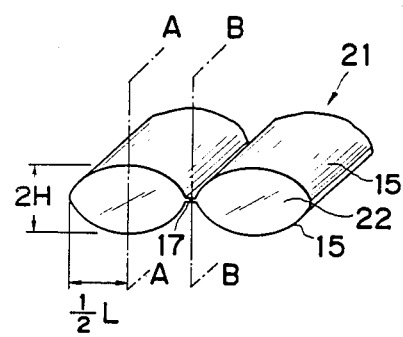
FIG. 6(b) is a fragmentary perspective view of a blank seal element formed by the die assembly shown in FIG. 6(a)
Figure 8A:
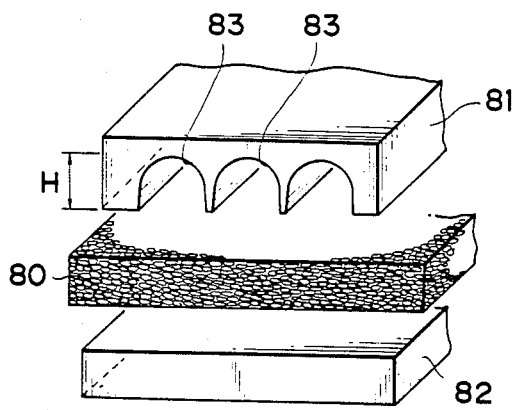
FIG. 8(a) is view similar to FIG. 7(a), but showing a conventional practice.
Figure 8B:
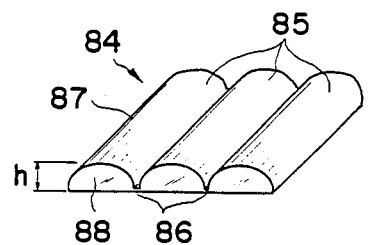
FIG. 8(b) is a perspective view of a blank seal element produced by the conventional practice shown in FIG. 8(a).

According to a modified embodiment shown in FIG. 6(a) through 7, a shaping die assembly is composed of a pair of upper and lower shaping dies 11,11 which are identical with the upper shaping die 11 of the foregoing embodiment shown in FIG. 4(a). The dies 11,11 are disposed in symmetric pattern and jointly define a plurality of parallel elongate grooves (two in the illustrated embodiment) of an elliptical cross section. Upon reciprocating movement of the shaping dies 11,11, a foam seat 14, which has been disposed between the dies 11,11, is shaped into a blank seal element 21. The blank seal element 21, as shown in FIG. 6(b), includes a pair of elongated bodies 22 of an elliptical cross section interconnected by a thin connecting portion 17 disposed therebetween. Each of the bodies 22 is cut centrally along a cutting plane A—A which includes the minor axis of the elliptical cross-sectional shapes. At the same time, the connecting portion 17 is cut along its center which is remote from the body 22 just severed. Thus, a substantially D-shaped sealing element 23 is produced as shown in FIG. 7. The sealing element 23 includes a substantially semi-elliptical or D-shaped body 24 and a sealing fin 20 extending along the apex of an arcuate portion 15 of the body 24. Contrary to conventional seal element made in accordance with the prior method shown in FIGS. 8(a) and 8(b), the seal element 33 provided in accordance with the present invention has not been subjected to undue compression during its manufacture and hence retain a high elasticity. Such seal element 23 can easily be installed in a joint structure and is particularly useful when installed in a corner joint structure.

The foam sheet may be made of a foamed material such as foam rubber including natural foam rubber an synthetic foam rubber, or cellular plastics such as polyethylene, polypropylene, propylene or other olefin polymer, polyvinylidene chloride or other vinyl polymer, or polyurethane. It is desirable to use a hydrophobic material when a water-tight seal is required. When a foam sheet of thermoplastic material is employed, forming is carried out on a cooled die assembly while heating the foam sheet. On the contrary, a hot die assembly is desirable when shaping a foamed thermosetting plastic sheet is used.

When polyurethane is employed, polybutadiene series polyurethane or dimer acid polyurethane is preferable since it contains hydrophobic materials. To improve the hydrophobic nature, an oil consisting essentially of hydrocarbon, petroleum resin or polybutene may be added. Preferably, these additives are used with such polyurethane obtained by reacting ether or ester of general use.

The foam sheet may have an open-cell structure or a closed-cell structure. However, the open-cell structure is preferable to the closed-cell structure because a seal element having such open-cell structure can be installed in a joint structure with a minimum muscle effort.

A seal element covered with a skin can easily be made from a foam sheet with a skin on each side. Alternatively, such skin may be formed during compressing of the foam sheet art elevated temperatures, or by laminating a film. Yet, an adhesive tape 25 with a sticky substance on opposite sides may be applied to the bottom surface of the seal element 19,23, as shown in FIGS. 5 and 7.

Obviously, many modifications and variations of the present invention are possible in the light of the above teachings. It is therefore to be understood that within the scope of the appended claims, the invention may be practiced otherwise than specifically described.

What is claimed is:

1. A seal element for providing a seal by being squeezed between opposed surfaces of a pair of joint members comprising:
    an elongate elastic body of an elastic material and having a pair of side surfaces sealingly engageable respectively with the surface of the joining members, one of said side surfaces having an outwardly bowed configuration, said elastic body having along its entire length an elongated sealing fin projecting integrally from said bowed one side surface;
    said sealing fin having less elasticity than said body;
    said body having a semi-elliptical cross-sectional shape defined by said one and other side surfaces, said other side surface including the minor axis of an ellipse containing said semi-elliptical crosssectional shape, said sealing fin extending perpendicular to said other surface; and whereby when said seal element is squeezed between the opposed surfaces of the joint members, said elastic body being elastically deformable in such a manner that said one bowed side surface is urged by said sealing fin to flex inwardly toward the other side surface and is held in sealing engagement with one of the opposed surfaces of the joint members.

2. A seal element according to claim 1, said elastic body being made of a foamed material.

3. A seal element according to claim 1, said elastic body including a skin.

* * * * *